United States Patent Office 3,417,980
Patented Dec. 24, 1968

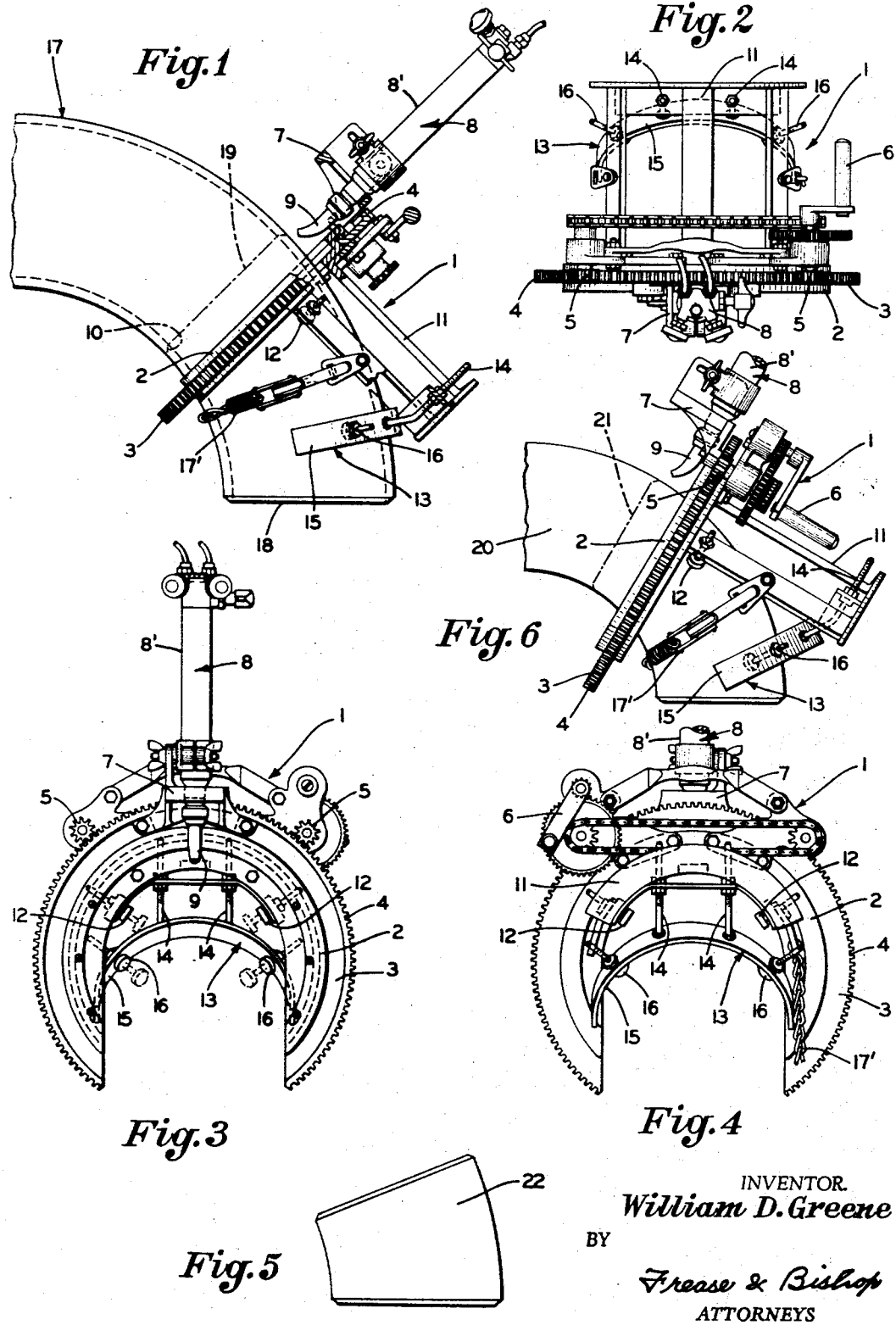

3,417,980
PIPE ELBOW BEVEL CUTTER CONSTRUCTION
William D. Greene, 540 Prospect Ave.,
Canal Fulton, Ohio 44614
Filed Mar. 24, 1966, Ser. No. 537,043
3 Claims. (Cl. 266—23)

ABSTRACT OF THE DISCLOSURE

A pipe cutting and beveling machine having segmental ring and track members provided with ends spaced apart to pass over a pipe to be cut. The machine has a saddle supporting the track member and a pair of support members on the saddle adjacent the track member for engagement with the pipe to position the axis of the track member concentric with the axis of a straight pipe, and clamping means for securing the saddle to a pipe section. A segmental ring is rotatable on the track member and a torch is mounted on the ring for planetary movement therewith.

Elbow locator means is mounted upon the saddle which, when the saddle is clamped to a pipe elbow section, positions the axis of the track member concentric with the intersection of the axis of the elbow section and a plane perpendicular to the elbow axis in defining the location of an elbow end to be cut. The cutting torch is parallel to the segmental ring and has an angled tip provided with an end angled to cut said elbow end with a bevel of predetermined angle.

---

The invention relates to a pipe cutting and beveling machine and more particularly to an improved construction of a typical straight-pipe cutting and beveling machine to convert such machine for use accurately to cut and bevel elbows with cut and beveled ends which are truly circularly formed in a plane normal to the axis of the elbow at the location of the plane.

The reclaiming of pipe for pipeline construction involves considerable economic savings. This is particularly the situation concerning reclaiming pipe elbows. It has been particularly difficult in the past accurately to cut the ends of curved or elbow pipe sections so that a cut and beveled end is formed as a true circle rather than as an ellipse. This condition arises because of the inability to locate the plane in which the cutting tool moves accurately at right angles to the axis of the pipe in the plane of the location of the cut.

Prior cutting and beveling machines in use for cutting the ends of elbows depend upon initially truly forming one elbow end shape, as in the manufacture of new elbows, in order that the beveling of the other end may be carried out accurately, because the initial true end of the workpiece is used as a reference plane for setting the workpiece up in the machine.

However, where reclaiming pipe elbows is involved, no truly located and shaped elbow reference plane is available which may be used to set up and square the elbow being reclaimed for a proper circular cut at the other end in typical prior machines.

Accordingly, objects of the present invention are to provide new pipe cutting and beveling machine construction which modifies prior straight-pipe bevel cutters so that true circular cuts in the proper plane accurately in pipe elbow sections may be made with any desired degree of elbow length between the truly cut ends of the elbow, such for example as to form a 90° elbow, a 45° elbow or a 22½° elbow, etc.; to provide a new modified construction which may be used accurately to cut and bevel elbow sections constructed of different pipe sizes; to provide a new construction enabling pipe elbows readily to be reclaimed; and to provide a construction which eliminates difficulties heretofore encountered in the art, achieves the stated objects, and satisfies existing needs.

These and other objects and advantages apparent from the following description may be obtained, the stated results achieved, and the described difficulties overcome by the structures, devices, elements, arrangements, parts and combinations which comprise the present invention, the nature of which is set forth in the following general statement, a preferred embodiment of which—illustrative of the best mode in which applicant has contemplated applying the principles—is set forth in the following description and shown in the drawing, and which are particularly and distinctly pointed out and set forth in the appended claims forming part hereof.

The nature of the improved pipe cutting and beveling machine construction may be stated in general terms as including in a pipe cutting and beveling machine of the type normally used in processing straight-pipe and having segmental ring and track members provided with ends spaced apart to pass the members over a pipe to be cut, a saddle supporting the track member, support means on the saddle for engagement with the pipe for positioning the axis of the track member concentric with the axis of the pipe, clamping means for securing the saddle to a pipe section, means for rotating the segmental ring on the track member, and means for mounting a torch on the segmental ring for planetary movement therewith; the combination of elbow locator means, means mounting the locator means on a cutter saddle with the locator means projecting from the saddle generally in a plane angular with respect to the plane of movement of a ring member in a cutter track member, whereby the saddle positioning support means and elbow locator means when the saddle is clamped to an elbow positions the axis of the track member concentric with the axis of the elbow in a first plane of an elbow end to be cut and positions the plane of said track member parallel with said first plane; cutting torch means mounted on the ring member having an angled tip, angled to cut a bevel of predetermined angle at said elbow end; and means mounting said torch means on said ring for movement with the ring, whereby the angled tip during planetary movement of the ring moves in a plane parallel with said first plane.

By way of example, an embodiment of the improved cutting and meveling machine construction is shown in the accompanying drawing forming part hereof, in which:

FIGURE 1 is a side elevation of a typical straight-pipe cutting and beveling machine modified to include the improved elbow cutting and beveling attachments and shown mounted on a pipe elbow being reclaimed to cut a 45° elbow;

FIG. 2 is a top plan view of the construction shown in FIG. 1;

FIG. 3 is a front view looking at 90° to the plane of the segmental ring and track members;

FIG. 4 is a rear view of the parts shown in FIG. 3;

FIG. 5 is a diagrammatic view of a 22½° elbow reclaimed from a used elbow; and

FIG. 6 is a view similar to FIG. 1 showing the equipment mounted for cutting and beveling a reclaimed elbow from a smaller pipe size.

Similar numerals refer to similar parts throughout the various figures of the drawing.

A typical straight-pipe cutting and beveling machine modified in accordance with the present invention is generally indicated at 1 and generally may include some of the structures shown in Patent No. 2,408,517.

The usual straight-pipe cutter has a stationary segmental track member 2 on which a movable segmental ring member 3 is rotatably mounted for planetary movement, the ring member 3 preferably being provided as a ring gear with gear teeth 4 engaged and driven by one or both of driving gears 5 which may be driven through a chain and gear drive from handle 6 in the usual manner.

A torch holder 7 is mounted on segmental ring 3 for rotation with the ring and a typical cutting torch indicated generally at 8 is adjustably mounted on torch holder 7. In accordance with the invention torch 8 has a body portion 8' and an angled tip 9 angled from said body portion in accordance with the bevel angle of a cut to be made as indicated at 10 in FIG. 1.

Torch body portion 8' is adjusted and clamped on torch holder 7 so that during planetary movement of segmental ring 3, the torch axis is parallel to and as close to the plane of ring 3 as possible. Thus, the end of angled tip 9 moves in a plane parallel with the plane of planetary movement of ring 3 and also as close as possible to the plane of ring 3. This is important in the adjustment and operation of the equipment so that a truly circular cut 10 will be made.

Cutter 1 has a usual saddle 11 which normally is supported on a straight-pipe by a plurality of pairs of spaced supporting members, to locate the axis of track 2 concentric with the axis of the straight-pipe. In accordance with the invention, one pair of spaced support means 12 of usual construction is retained. The other pair of such support means is eliminated, and replaced by elbow locator means generally indicated at 13 mounted in any desired manner as by members 14 on saddle 11.

Elbow locator means 13 preferably includes a locator segment 15 positioned generally in a plane at an angle to the plane of movement of ring 3 (FIG. 1). Segment 15 is provided with a series of support members 16. Support members 16 like support members 12 are adjustable.

Referring to FIG. 1, a segment of a used pipe elbow is indicated at 17 from which an elbow member is to be reclaimed. One end of the member 17 already has been cut and beveled as indicated at 18 using the improved tool with its position reversed. The cutter 1 is then turned to the position shown in FIG. 1 relative to pipe section 17, and support means 12 and 16 are adjusted, and clamp 17' is engaged with saddle 11 and elbow section 17 in fixed position to locate the cutter 1 with reference to elbow section 17 such that a beveled cut 10 is formed in a plane parallel to the plane of ring 3 and indicated by dot-dash line 19, by planetary movement of angled tip 9. Cut 10 presents a true circle since it lies in a plane 19 normal to the axis of pipe section 17 at the location of such plane 19.

Thus, the plane 19 of cut 10, the plane of movement of the end of angled tip 9, and the plane of movement of ring 3 are parallel to each other and all are normal to, or at right angles to, the axis of elbow section 17 at the location of the plane 19 of the cut 10.

These relationships are important since they achieve the objective of forming true circular bevel-cut ends on elbow sections reclaimed from used pipe. Further, these relationships are maintained in the adjustment and operation of the equipment because of the mounting of the axis of torch 8 in one of the parallel planes so that the end of its angled tip 9 angled to form the bevel can be located as close as possible to the plane of the ring 3; and because of the provision of the angularly positioned locator means 13. The adjustment of the support members 16 angularly arranged with respect to the support members 12 permits the equipment to be clamped on an elbow 17 in a position such that the described circular cut 10 can be made in the plane 19 normal to the axis of the elbow where such axis passes through the plane 19.

FIGURE 1 illustrates cut 10 being made such as to reclaim a 45° elbow from used elbow section 17. Once the adjustments of support members 16 and 12 have been made for an elbow having the degree of curvature and pipe size shown, for example in FIG. 1, any number of truly circular cuts can be made on elbows of similar curvature and pipe size by mounting the equipment at any desired location along the curvature of the elbow. For example, other elbow sections can be reclaimed such as the elbow 22 shown in FIG. 5.

Adjustment of the supporting means 16 and 12 to positions shown in FIG. 6 may be made to accommodate an elbow section 20 of smaller size and greater curvature and with which a cut may be made, for example, as indicated by the dot-dash line 21.

Accordingly, the improved modifying attachments for a typical straight-pipe cutting machine, the angularly located elbow support means and the angled tip located closely adjacent the segmental track member and traveling in a path lying in a plane parallel with the plane of the cut provides a construction which enables elbow sections to be reclaimed from used pipe and solves problems and avoids difficulties existing in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example and the scope of the invention is not limited to the exact details, sizes, etc. described, or shown because various sized cutting machines may be made without departing from the fundamental principles set forth.

Having now described the features, discoveries and principles of the invention, the manner in which the new construction may be arranged and used, the characteristics thereof and the advantageous, new and useful results obtained; the new and useful structures, devices, elements, arrangements, parts and combinations, and mechanical equivalents obvious to those skilled in the art are set forth in the appended claims.

I claim:

1. In a pipe cutting and beveling machine having segmental ring and track members provided with ends spaced apart to pass the members over a pipe to be cut, a saddle supporting the track member, a pair of support members on the saddle adjacent the track member for engagement with the pipe to position the axis of the track member concentric with the axis of a straight pipe, clamping means for securing the saddle to a pipe section, means for rotating the segmental ring on the track member, and torch mounting means on the segmental ring for planetary movement with the ring; the combination of elbow locator means, means mounting the locator means on said saddle with the locator means projecting from the saddle generally in a first plane angular with respect to a second plane in which a ring member rotatably moves on said track member, a pair of support members on said locator means; whereby said pairs of support members on the saddle and the elbow locator means, when the saddle is clamped to a pipe elbow section, position the axis of the track member concentric with the intersection of the axis of the elbow section and a third plane perpendicular to said elbow axis and defining the location of an elbow end to be cut, and position said second, ring and track member, plane parallel with said third plane; cutting torch means carried by and adjacent to the segmental ring and having an angled tip provided with an end, said tip being angled to cut said elbow end in said elbow section with a bevel of predetermined angle; and means locating said cutting torch means on a torch mounting means to move the angled tip end of said torch means during planetary movement of the ring in a fourth plane parallel with said second and third planes.

2. The construction defined in claim 1 in which the cutting torch means includes a body portion which has an axis, in which said body portion is located on the ring member torch mounting means with its axis lying in a plane parallel with said second, track, plane; and in which said angled tip is angled downwardly outwardly from said body portion toward the elbow section in which the end cut is to be made.

3. The construction defined in claim 1 in which said pair of elbow locator support members are adjustable to accommodate various pipe sizes and elbow curvatures of elbows to be cut.

References Cited

UNITED STATES PATENTS

| 1,998,729 | 4/1935 | Mathey et al. | 33—21 X |
| 2,848,215 | 8/1958 | Pendergrass | 266—23 |

J. SPENCER OVERHOLSER, *Primary Examiner.*

ROBERT D. BALDWIN, *Assistant Examiner.*

U.S. Cl. X.R.

33—21; 148—9.6